Feb. 22, 1938. H. C. THEISS 2,108,874
DUST GUARD FOR JOURNAL BOXES ON RAILROAD TRUCKS
Filed June 13, 1936   2 Sheets-Sheet 1
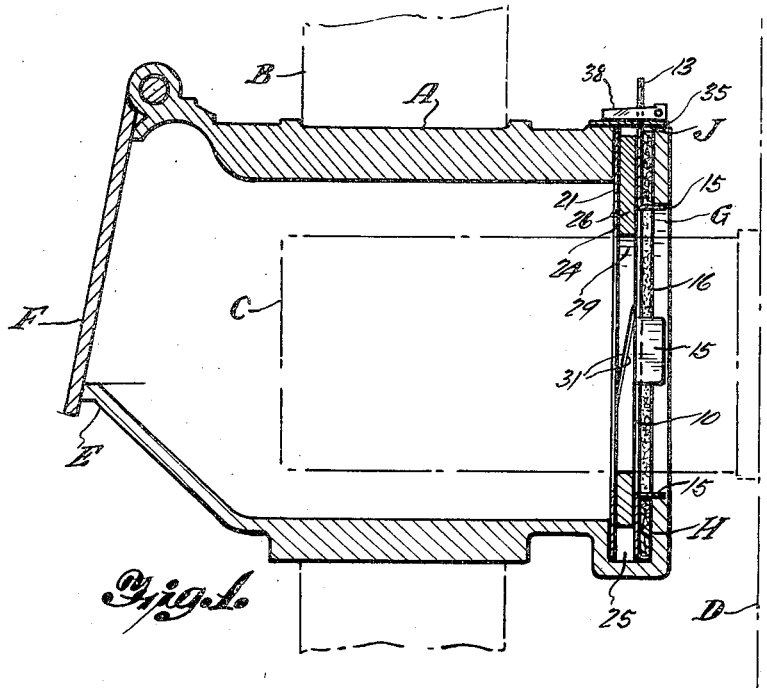
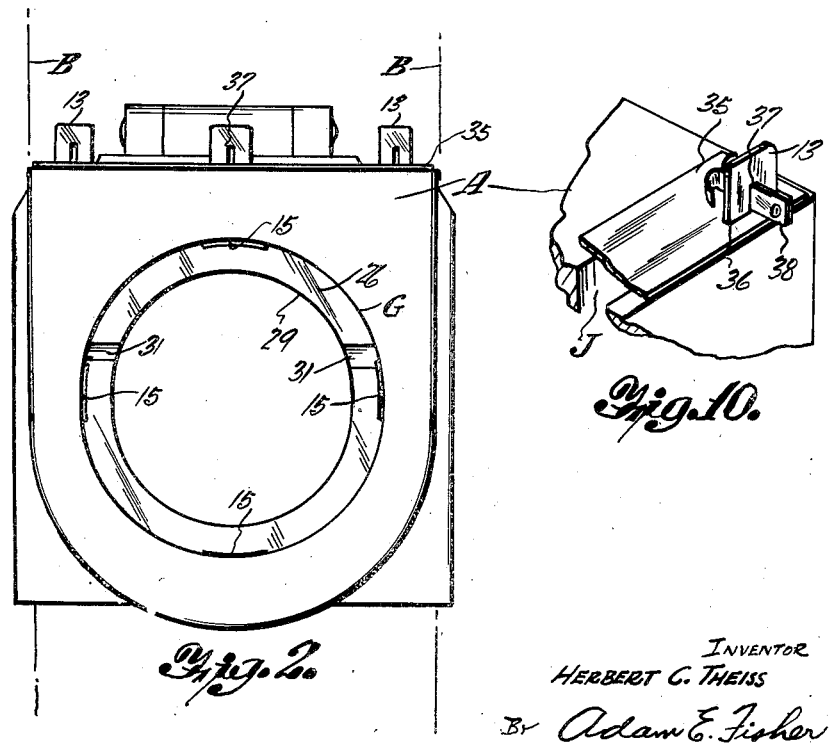
INVENTOR
HERBERT C. THEISS
By Adam E. Fisher
ATTORNEY Feb. 22, 1938.  H. C. THEISS  2,108,874
DUST GUARD FOR JOURNAL BOXES ON RAILROAD TRUCKS
Filed June 13, 1936  2 Sheets-Sheet 2
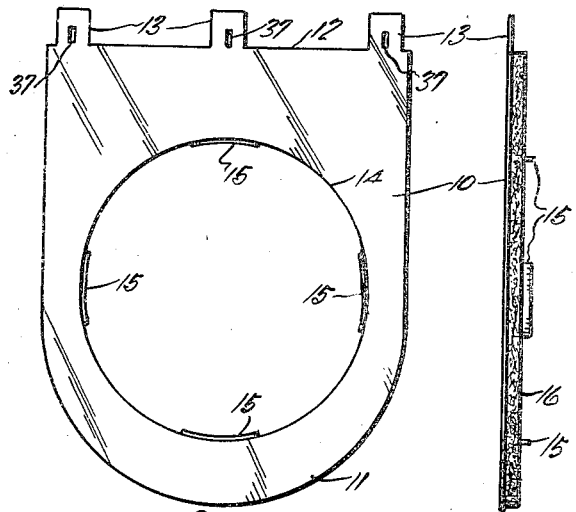
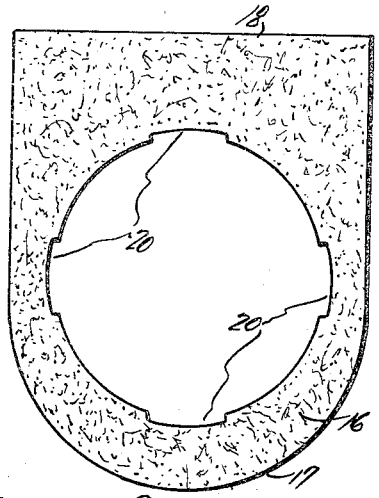
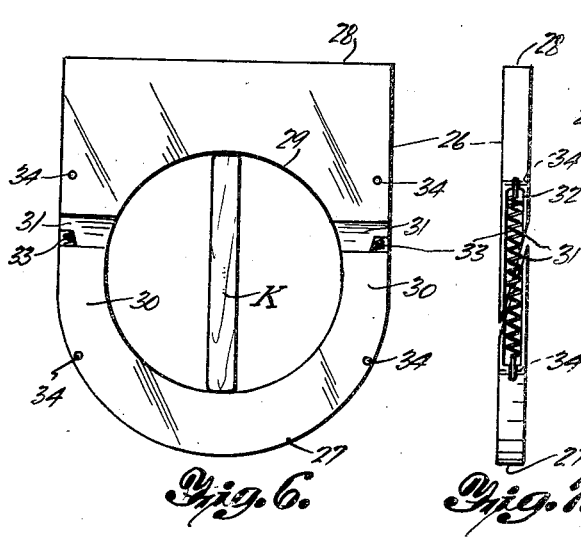
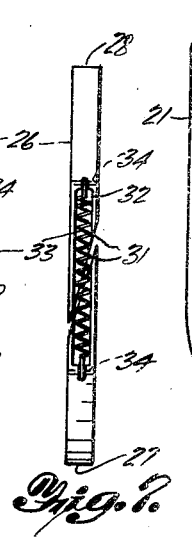
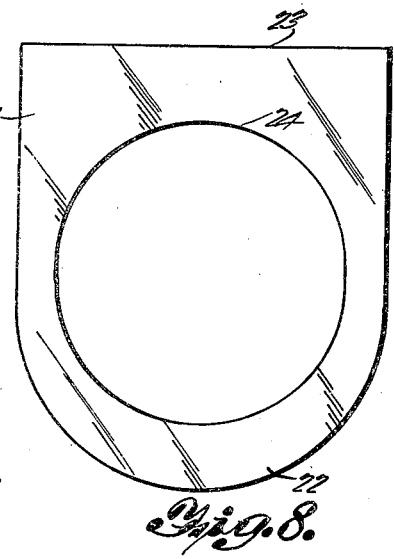
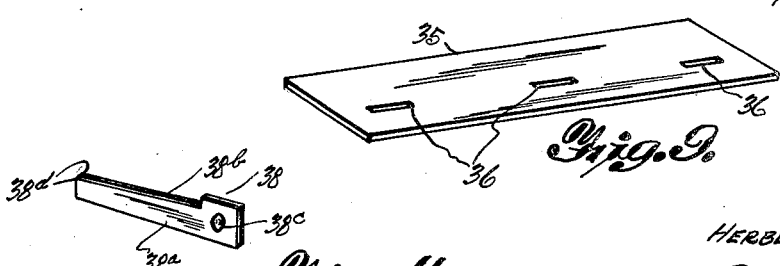
INVENTOR
HERBERT C. THEISS
By Adam E. Fisher
ATTORNEY Patented Feb. 22, 1938

2,108,874

UNITED STATES PATENT OFFICE 2,108,874

DUST GUARD FOR JOURNAL BOXES ON RAILROAD TRUCKS

Herbert C. Theiss, St. Louis, Mo.

Application June 13, 1936, Serial No. 85,046

3 Claims. (Cl. 286—6)

My invention relates to improvements in dust guards and oil seals used in railroad journal boxes.

The main object of my invention is to provide a dust guard and oil seal assembly which may be readily and easily placed in the journal box and removed therefrom.

Another and prime object is to provide an assembly of this kind which will provide a positive and enduring dust and oil seal to prevent the entrance of dust into the box around the journal and the escape of oil therefrom.

Another object is to provide an assembly of this kind including a minimum number of parts any of which may be readily replaced when necessary.

A further object is to provide an assembly of this kind in which the only journal engaging member and thus the only part subject to wear has automatic spring take up or compensation for wear to maintain a dust and oil tight joint for a long period of use.

With these and other objects in view the invention resides in the novel construction and arrangement of parts as hereinafter fully set forth and claimed, reference being had to the accompanying drawings as showing a preferred embodiment of my invention for purposes of exemplification.

In the drawings:

Figure 1 is a vertical cross section through a conventional form of journal box showing my sealing assembly mounted therein and showing the journal in dot dash lines.

Figure 2 is an inner end elevation of the journal box equipped with my seal.

Figure 3 is an end view or elevation of the inner metal liner or plate alone.

Figure 4 is an edge view of the inner liner and its felt sealing cover or facing.

Figure 5 is an end view of the felt cover alone.

Figure 6 is an end view of the sealing plate or block alone.

Figure 7 is an edge view thereof.

Figure 8 is an end view of the outer metal liner alone.

Figure 9 is a perspective view of the cover plate alone.

Figure 10 is a fragmental detail perspective view of the cover plate showing the method of securing the same in place by a split key.

Figure 11 is a perspective view of one of the split keys alone.

Referring now with more particularity to the drawings the reference character A designates a railroad journal box of a well known form the same being mounted in the pedestal B of a usual form of railroad car truck (not shown) and acting as a support and lubricating means for the outer end of the journal C which projects outwardly from the wheel D. The outer end E of the box A has a lid F through which oil soaked cotton waste is inserted to lubricate the journal C and at the inner end a large opening G passes and clears the journal. Surrounding this opening is the usual dust guard well H opening out through the upper side of the box A as at J. It is obvious that with the opening G necessarily large to permit vertical play of the journal C in the box and to prevent wear on the box it is necessary that some means be provided to keep dust and other foreign matter from entering the box and causing undue wear on the journal and it is likewise necessary to provide means to prevent oil from escaping from the box. Hitherto this has been done by means of some form of rubber or leather element seated in the well H and having a hole to pass but to nicely fit journal C. However this element being as stated of resilient material rapidly wears away and frequent replacement is necessary to prevent the ingress of dust and loss of oil.

My invention comprises an inner metal liner or anchor plate 10 rounded off on its lower end 11 and adapted to fit down into the dust guard well H with its square or straight upper end 12 falling just below the level of the opening J and the spaced ears 13 projecting upwardly therefrom. These ears 13 are formed integrally with and extended from the upper end of the liner 10 as shown. The inner liner 10 has an opening 14 elongated vertically somewhat and substantially the same size as the opening G in the journal box. At spaced points around this opening 14 lock or anchor lugs or tabs 15 are turned at right angles from the liner and when the same is in place these lugs 15 extend inwardly and fit within the opening G to anchor the liner in place in the journal box.

A sealing cover or facing 16 of felt or other resilient material is provided for the inner face of the liner 10 and this cover is shaped to fit the liner nicely, having thus a rounded lower end 17 and straight upper end 18 and with an opening 19 cut to register with the opening 14 in the liner. The margins of this opening 19 have spaced notches 20 to clear the anchor lugs 15 and when the liner 10 is mounted as described the felt facing 16 is pressed around the margin of the opening G to prevent dust, etc. from entering therearound.

An outer metal liner or bearing plate 21 is provided and same is of the same shape and size as the inner liner 10, having a rounded lower end 22, straight upper end 23 and central vertically elongated aperture 24. This liner 21 does not however have the ears 13. This outer liner 21 is to be placed in the well H against the outer face thereof and spaced outwardly from the inner liner to provide a space 25.

A journal sealing plate or block 26 is provided and same is, when assembled, substantially of the same shape as the liners 10 and 21, having a rounded lower end 27 and straight upper end 28, but this plate is shorter from end to end than the said liners whereby when it is inserted in the well H in the space 25 between the liners it can play vertically therebetween as will be understood from an inspection of Figure 1. This sealing plate has a central aperture 29 which is shaped to nicely fit the journal C wherein it differs from the openings 14 and 24 in the liners which are, as stated, elongated vertically to permit play of the journal and also are of such size as to clear the journal all around.

The sealing plate is cast from any suitable wear resisting metal and is considerably thicker than the liners 10 and 21 and the narrow sides 30 each side of the aperture 29 are parted or cut apart at 31 on a line extending obliquely or angularly from one face of the plate to the other thus dividing the plate into an upper and lower part. The sides 30 are then grooved out in their edges as at 32 to form channels in which retractile coil springs 33 are placed and confined, the ends of these springs being attached by pins 34 to the said upper and lower parts of the plate. The springs 33 thus cause a drawing together of the parts which tends to reduce the size of the aperture 29 and at the same time through the wedge or cam action of the obliquely cut faces 31 tend to spread the upper and lower sections of the plate apart and in effect increase the thickness thereof.

The sealing plate 26 thus formed is as stated mounted in the space 25 between the inner and outer liners 10 and 21 and the opening 29 nicely engages the journal C around its entire periphery thus effectually preventing either the ingress of dust or the loss of oil from the box A. At the same time the sealing plate may play freely between the liners as the journal C moves or "bounces" therein and to this end the liners serve as bearings or guides for the plate.

As the margin of the opening 29 wears the springs 33 tend to draw the upper and lower sections of the plate together as stated and maintain the opening in nice engagement with the journal so compensating for wear over a long period of running time. At the same time these springs tending to increase the thickness of the sealing plate by the oblique cuts 31 cause the plate to expand against the liners 19 and 21 and press the felt facing 16 of the inner liner tightly around the opening G forming a tight seal at this point. To close the opening J and to hold the dust guard parts assembled I provide a cover plate 35 of flat rectangular form considerably larger than the opening J and having spaced slots 36 to clear the upstanding ears 13. These ears have slots 37 vertically elongated and so placed as to fall at their lower ends below the level of the cover plate 35. When this cover plate 35 is put in place split keys 38 formed as shown of two strips of metal 38a and 38b riveted together at 38c near one end have their opposite narrower ends 38d inserted through the slots 37 and they are then driven home causing a wedging action which presses the cover plate 35 firmly to its seat over the opening J. The free ends of the pin 38 may then be spaced apart as shown to prevent their removal.

From the foregoing it will be apparent that a dust and oil tight seal is provided both around the journal C and the margin of the opening G and that also the top of the dust guard well is tightly closed by the cover plate 35. The guard parts are readily assembled and for this purpose the two sections of the sealing plate 26 may be sprung apart to expand the opening 29 to clear the journal C by a short stick K inserted as shown in Figure 6. The removal of any part of the dust guard is also readily accomplished by simply removing the keys 38 and cover plate 35.

While I have herein set forth a certain preferred embodiment of my invention it is understood that I may vary from the same in minor structural details so as best to provide a practical device for the purposes intended, not departing from the spirit of the invention and within the scope of the appended claims.

I claim:

1. In combination with a railroad journal box and journal, the said box having a journal opening in its inner end to clear the journal and having a dust guard well inwardly of the said journal opening and this well opening out through the top of the box, a dust guard assembly including an inner liner mounted in the dust guard well and having an opening registering with the journal opening, lugs turned inwardly from the said opening and engaging the margins of the journal opening, slotted ears extended from the liner up through the top opening into the dust guard well, an outer liner mounted in the dust guard well and spaced from the inner liner, this outer liner also having an opening registering with the journal opening, a sealing plate slidably mounted between the liners and having an opening to fit and engage the said journal, a cover plate having slots to fit down over the said ears on the inner liner whereby this cover will close the top opening into the dust guard well, and tapered split keys adapted to be driven through the slots in the said ears to press the cover plate down against the journal box.

2. In combination with a railroad journal box and journal, the said box having a journal opening in its inner end to clear the journal and having a dust guard well inwardly of the said journal opening and this well opening out through the top of the box, a dust guard assembly including an inner liner mounted in the dust guard well and having an opening registering with the journal opening, lugs turned inwardly from the said opening and engaging the margins of the journal opening, slotted ears extended from the liner up through the top opening into the dust guard well, an outer liner mounted in the dust guard well and spaced from the inner liner, this outer liner also having an opening registering with the journal opening, a sealing plate slidably mounted between the liners and having an opening to fit and engage the said journal, a cover plate having slots to fit down over the said ears on the inner liner whereby this cover will close the top opening into the dust guard well, tapered split keys adapted to be driven through the slots in the said ears to press the cover plate down against the journal box, and a felt facing for the inner liner whereby the margin of the journal opening will be sealed.

3. In combination with a railroad journal box and journal, the said box having a journal opening in its inner end to clear the journal and having a dust guard well inwardly of the said journal opening and this well opening out through the top of the box, a dust guard assembly including an inner liner mounted in the dust guard well and having an opening registering with the journal opening, lugs turned inwardly from the said opening and engaging the margins of the journal opening, slotted ears extended from the liner up through the top opening into the dust guard well, an outer liner mounted in the dust guard well and spaced from the inner liner, this outer liner also having an opening registering with the journal opening, a sealing plate slidably mounted between the liners and having an opening to fit and engage the said journal, a cover plate having slots to fit down over the said ears on the inner liner whereby this cover will close the top opening into the dust guard well, tapered split keys adapted to be driven through the slots in the said ears to press the cover plate down against the journal box, a felt facing for the inner liner whereby the margin of the journal opening will be sealed, the said sealing plate being formed of two sections with meeting obliquely cut ends each side of its opening, and springs stretched between the two sections whereby they are normally drawn together closing the opening around the journal.

HERBERT C. THEISS.